March 7, 1933.   E. C. WELSH   1,900,532
TRAFFIC REGULATOR
Original Filed Oct. 6, 1928   7 Sheets-Sheet 1

Fig.1.

INVENTOR
Ezra C. Welsh,

March 7, 1933.   E. C. WELSH   1,900,532
TRAFFIC REGULATOR
Original Filed Oct. 6, 1928   7 Sheets-Sheet 4

INVENTOR
Cyra C. Welsh,
By Byrne, Stebbins & Parmelee
his attys.

March 7, 1933.  E. C. WELSH  1,900,532
TRAFFIC REGULATOR
Original Filed Oct. 6, 1928  7 Sheets-Sheet 5

INVENTOR
Ezra C. Welsh

March 7, 1933.   E. C. WELSH   1,900,532
TRAFFIC REGULATOR
Original Filed Oct. 6, 1928   7 Sheets-Sheet 6

INVENTOR

Patented Mar. 7, 1933

1,900,532

UNITED STATES PATENT OFFICE

EZRA C. WELSH, OF GRIMSBY, ONTARIO, CANADA

TRAFFIC REGULATOR

Application filed October 6, 1928, Serial No. 310,747. Renewed June 24, 1932.

The present invention relates broadly to the art of signalling, and more particularly to an improved mechanism of the character indicated, adapted to be utilized for the control and regulation of both vehicular traffic at a street intersection and pedestrian traffic. At the present time the problem of properly regulating pedestrian traffic in accordance with the movement of vehicular traffic is receiving more and more attention, it being quite common in many cities to provide special police officers both for the pedestrian traffic and the vehicular traffic.

It is one of the objects of the present invention to provide a traffic regulator adapted to be positioned at desired intersections, and of such nature as to provide a control both for the vehicular traffic moving on the highways and the pedestrian traffic on the sidewalks adjacent thereto. Ordinary traffic lamps for the control of vehicular traffic comprise a series of different colored lamps adapted to be operated in predetermined sequence for the purpose of indicating successively "stop" conditions on a given highway, "traffic change" conditions on such highway, and "go" conditions thereon.

Ordinarily such conditions respectively are indicated by red, amber, and green lights. In view of the widespread adoption of such systems, control mechanisms have been provided which determine the time of operation and the duration of each of the different conditions.

Another object of the present invention is to provide a traffic regulator adapted to be itilized with control mechanisms of the character referred to whereby not only are light conditions provided in accordance with the present practice, but also control means for the pedestrian traffic, preferably in the form of barriers adapted to work in predetermined timed relation with the lamps to provide a physical obstruction to pedestrian traffic on the sidewalks.

In the accompanying drawings I have shown for purposes of illustration only, a preferred embodiment of the present invention, it being understood that the drawings do not define the limits of the invention, inasmuch as changes in the design and construction of the various parts and in the operating mechanism therefor may be made without departing either from the spirit of the invention or the scope of my broader claims.

In the drawings:—

Figure 4' is a detail view of the adjusting mechanism for the sprocket chain;

In carrying out the present invention, I may utilize a unit of any desired constructional characteristics, but for purposes of illustration I have herein indicated a unit as comprising a standard 2, of any desired ornamental appearance, comprising a base portion 3, carrying a main column 4, upon which may be supported an ornamental top 5. Projecting from the upper portion of the column 4 are brackets 6, preferably extending in a direction generally radially from the column and carrying at their outer ends a signal box 7 within which may be mounted a series of lamps r, a, and g (see Figure 14), adapted for the illuminating in desired sequence of a plurality of lenses herein designated by the letters R, A, and G, indicating respectively red, amber and green, although it will be understood that any other desired color combinations may be employed.

Projecting outwardly from the brackets 6 are brackets 8, carrying at their outer ends a signal box 9, similar to the signal box 7, and also having a series of lenses R', A' and G', with which cooperate lamps in the manner before referred to.

The column 4 is provided on diametrically opposite sides thereof with longitudinally extending slots or openings 10 (Figure 5), in which are positioned yieldable closing and weather-stripping means 11. Extending upwardly within the column 4 and located adjacent the respective openings 10, are tubular guides 12, supported at their lower ends on a plate 13, and carried at their upper ends in the transversely extending brace 14. Intermediate their ends there may be provided a centering plate 15 giving increased rigidity thereto.

Each of the guides 12 is formed with a longitudinally extending slot 16 in one side thereof, and with a second slot 17 in another side and spaced an angular distance of substantially 90 degrees from the slot 16. Extending through each of the slots 16 and into a carrier 18 within each of the tubular guides 12 is a pin 19, the pins 19 at their outer ends being secured to a sprocket chain 20, one of the pins being secured to one run of the chain, and the other pin to the other run thereof. The chain 20 extends at its upper end around a sprocket 21, adjustably carried by a screw 22, and at its lower end between idlers 23 to a driving sprocket 24, adapted to be driven by a motor 25 in the manner hereinafter described.

Figures 4, 8, 13:
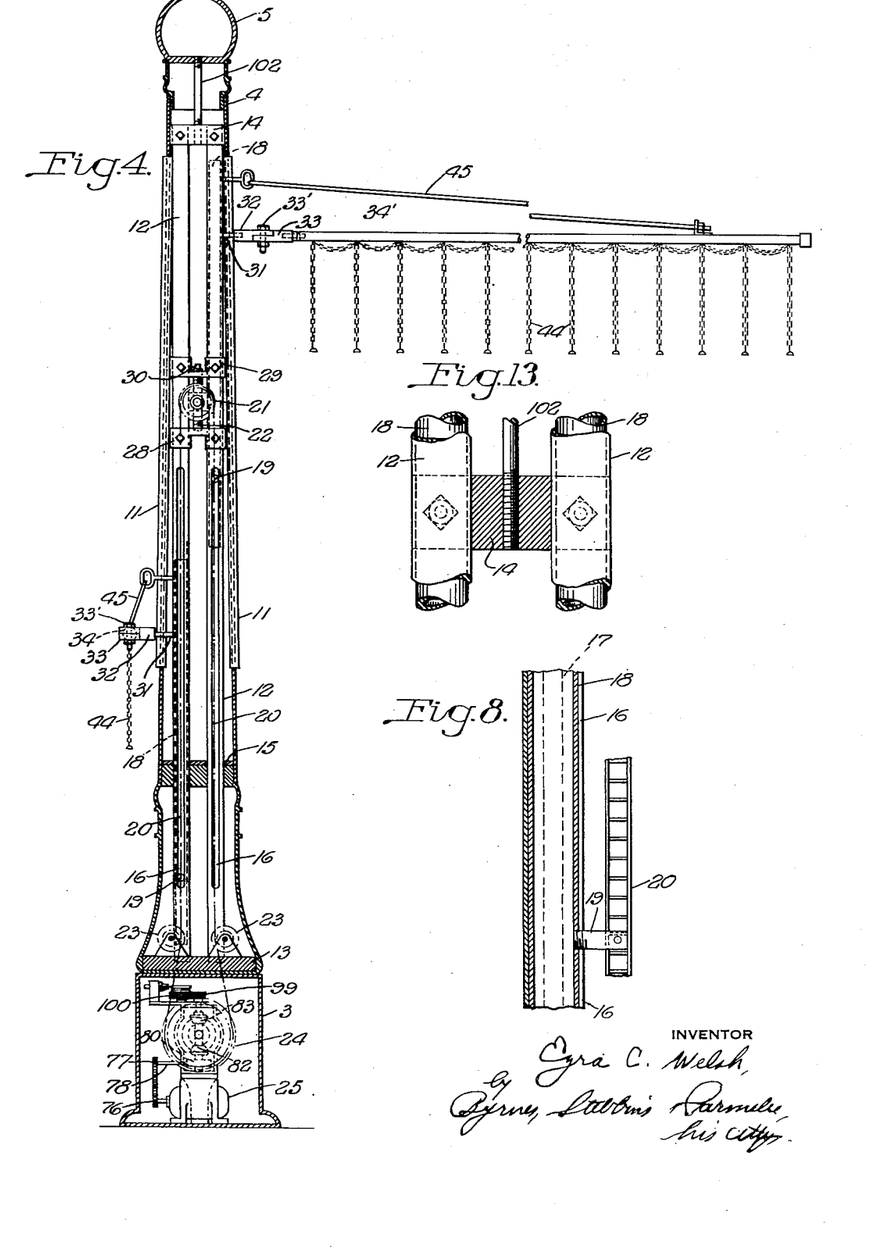
Figure 4 is a view similar to Figure 3, looking in the opposite direction.
Figure 8 is a detail sectional view, on an enlarged scale, of a portion of the operating and supporting mechanism for one of the pedestrian control means.
Figure 13 is a detail sectional view, on an enlarged scale, of the upper portion of one of the units.
Figures 4, 5:
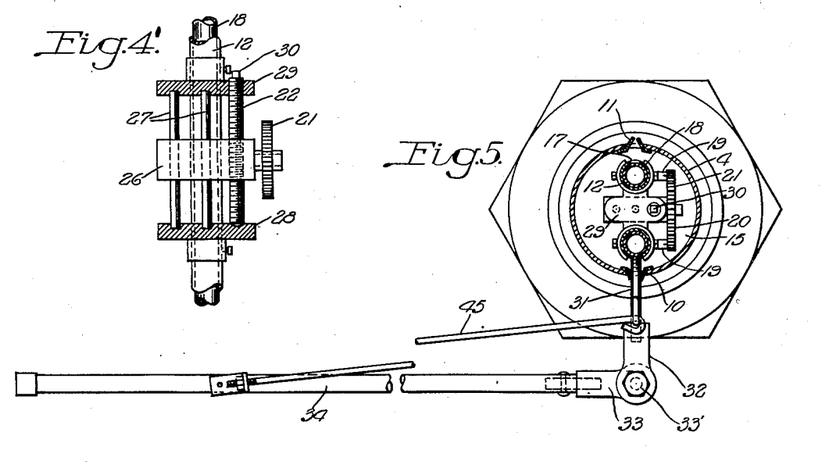
Figure 5 is a detail sectional view, on an enlarged scale, and partly broken away, on the line V—V of Figure 2, looking in the direction of the arrows.
Figure 6:
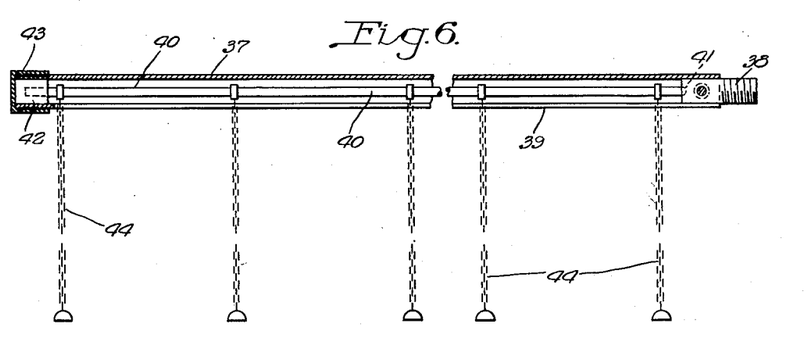
Figure 6 is a detail sectional view, on an enlarged scale and partly broken away, of one of the pedestrian control means.
Figure 7:
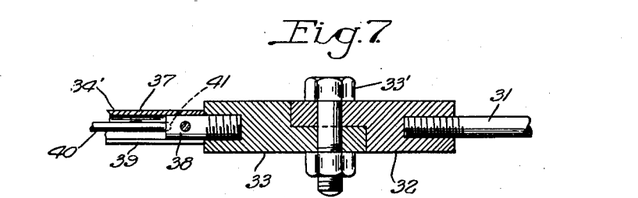
Figure 7 is a detail sectional view, on an enlarged scale, of the mounting for one of the pedestrian control means.
Figure 9:
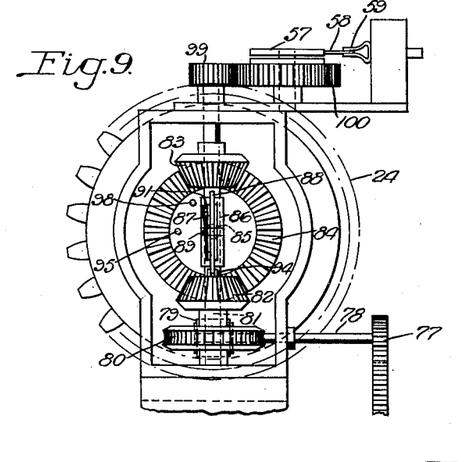
Figure 9 is a front elevational view, on an enlarged scale, of a portion of the mechanism for effecting movement of the pedestrian control means.

In Figure 4' I have illustrated in detail the construction of the adjusting screw 22, and its associated parts. As apparent from this figure, the shaft 26 on which the sprocket 21 is loosely mounted, is guided on pins 27 extending vertically between spaced plates 28, carried by the tubular guides 12, the screw 22 passing through the shaft 26 and abutting at its lower end against the bottom plate 28, and having at its upper end a suitable bearing 29, the extreme upper end of the screw conveniently being formed with a square head 30 to facilitate adjustment by the use of a wrench in known manner.

The slots 17 in the tubular guides 12 are so formed as to lie adjacent to and in the plane of the openings 10 through the column 4. Extending through each opening 10 and the adjacent slot 17 is a pin 31, each of the pins being threaded at its inner end into the carrier 18 and at its outer end into a hinge block 32. Cooperating with the hinge block 32 is a similar block 33, the two being held in cooperative relation by clamping bolt 33', the construction being such that upon loosening the clamping bolt the hinge block 33 and its associated parts may be moved in any desired relationship to the hinge block 32. Carried by the hinge block 33 on one side of the column is a pedestrian control means 34, a similar pedestrian control means 34' being carried by the hinge block 33 at the opposite side of the column.

In the illustrated embodiment of the invention the pedestrian control means 34 is indicated as lying substantially parallel to a plane tangent to the column, while the control means 34' is indicated as extending substantially radially therefrom, whereby the pedestrian control means extend at substantially right angles to each other. By reason of this arrangement, the control means 34 is adapted to control traffic along each of the walks W, in the direction indicated by the arrows 35, while each of the control means 34' is adapted to control traffic along each of the walks W', in the direction indicated by the arrows 36.

Each of these control means comprises a tubular arm 37 telescoping at its inner end over a pin 38 projecting outwardly from the hinge block 33. Each of the arms 37 is formed in the bottom portion thereof with a longitudinally extending slot 39, and within its interior above the slot, is provided with a rod 40, such rods bearing at their inner ends against recessed seats 41, and at their outer ends in suitable depressions in plugs 42, the parts being held in assembled position by means of caps 43 screwed onto the outer ends of the arms. Carried by the rods 40 and projecting downwardly any desired distance therefrom is a series of ropes or chains 44, of such nature as to contact with the heads of pedestrians on the sidewalks when the control means are in lowered position to warn them against stepping into the street. Cooperating with each of the arms 37 is bracing means 45, of any desired construction.

By reason of the fact that the control means 34 and 34' are secured by means of the pins 31 to the carriers 18, it will be apparent that they will be raised or lowered in accordance with the movement of such carriers. These carriers in turn are operated by means of the pins 19, secured to the runs of the sprocket chain 20, whereby one of the carriers is moved upwardly upon movement of the sprocket chain, simultaneously with a downward movement of the other carrier, the two movements taking place at exactly the same speed since they are both controlled by a common chain.

Figure 1:
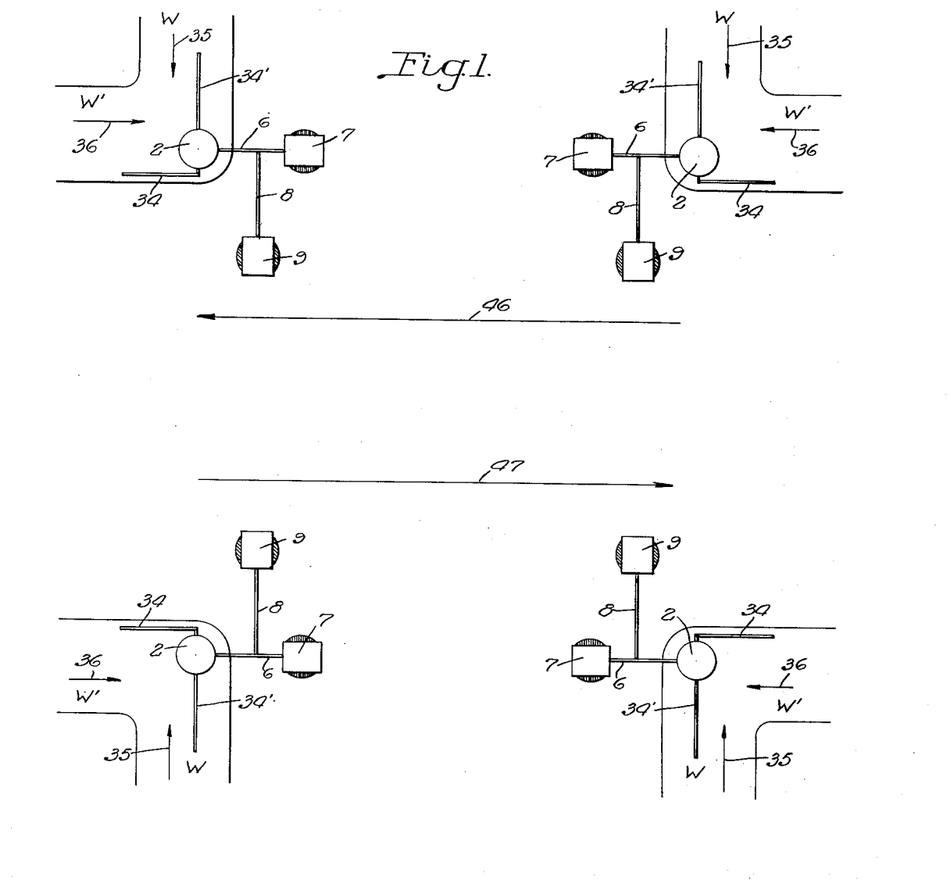
Figure 1 is a top plan view, largely diagrammatic, of a street intersection having my improved traffic regulators in operative position for controlling both vehicular and pedestrian traffic.
Figure 2:
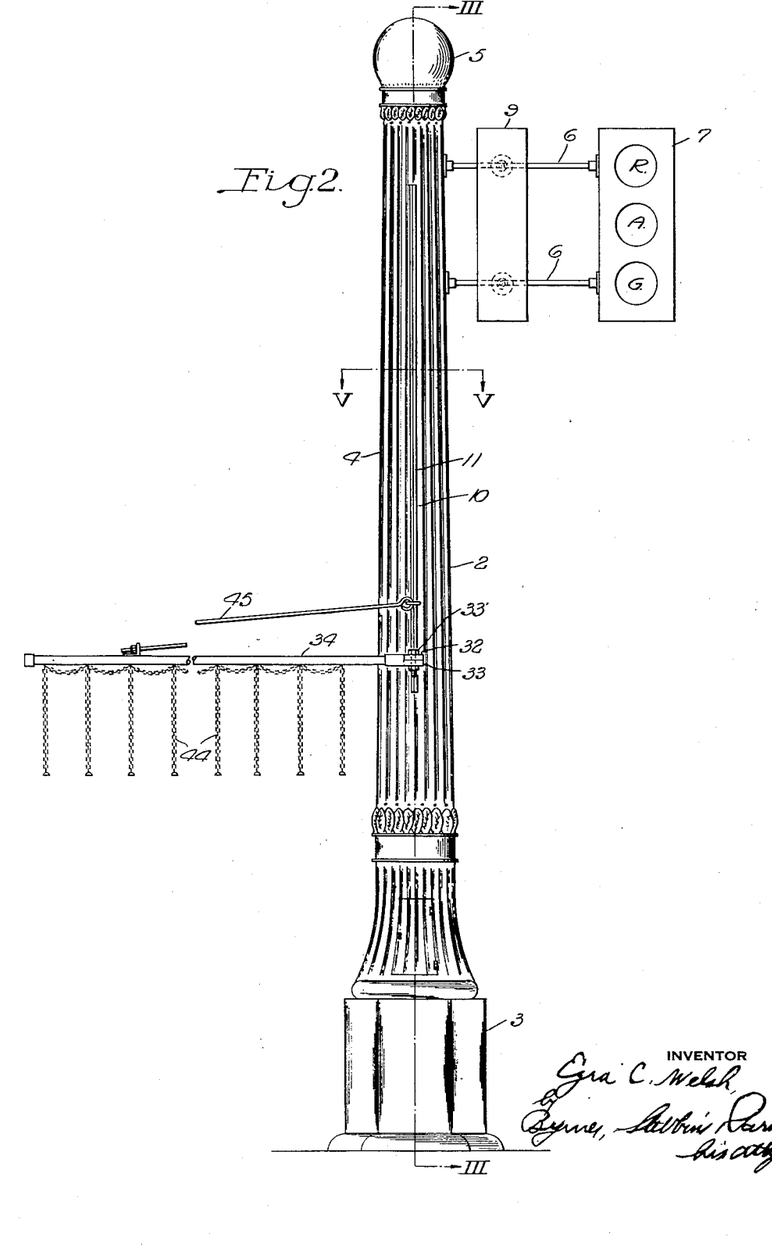
Figure 2 is a side elevation of an individual traffic regulator of the character illustrated in Figure 1.

In order to effect a proper regulation of pedestrian traffic and vehicular traffic, it is obviously essential that the pedestrian control means 34 and 34' be operated in definite timed relationship to the operation of the lamps within the signal boxes 7 and 9 in such manner that when the red lamps $r$ within the signal box 7 are energized, the control means 34 will be in their lower positions, and the control means 34' in their raised positions, this condition being illustrated in Figure 1 of the drawings, at which time vehicular traffic is in the direction indicated by the arrows 46 and 47, and pedestrian traffic in the direction indicated by the arrows 36. At this time the green signal lenses within the signal box 9 will be illuminated for the control of traffic in the direction indicated by the arrows 46 and 47. As the lamps in the signal box 7 change from illuminating the red lenses to the amber lenses, and the lamps in the signal box 9 change from illuminating the green lenses to the amber lenses, the operating mechanism for the control means will be energized to effect a raising of the control means 34 and a lowering of the control means 34'.

Figure 14:
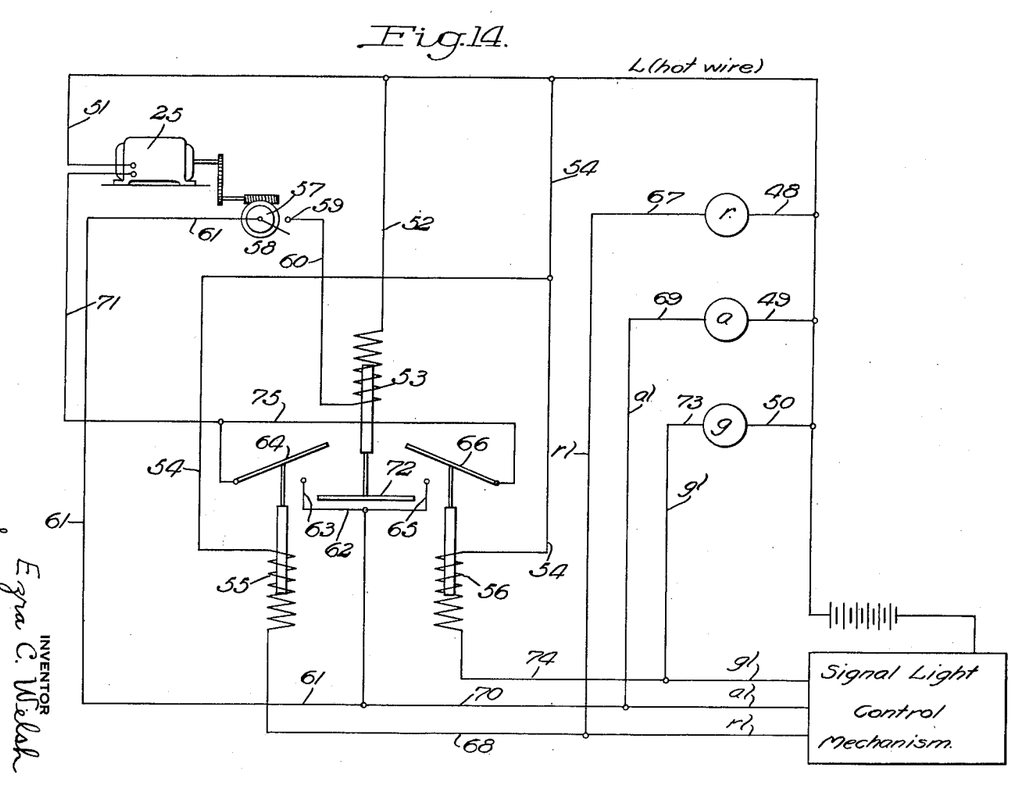
Figure 14 is a wiring diagram illustrating diagrammatically the circuits for a unit, as shown herein.

Such an operation is obtained by the circuit connections illustrated diagrammatically in Figure 14 of the drawings. In this figure there are shown the line wires L, $rl$, $al$ and $gl$ coming from the usual control mechanism provided for such light signals. The line L has a connection 48 to one side of the lamp $r$, a connection 49 to one side of the lamp $a$, and a connection 50 to one side of the lamp $g$. It likewise has a connection 51 to one side of the motor 25, a connection 52 to one terminal of a solenoid 53, and a connection 54 to one terminal of the coil of the magnetic switch 55 and one terminal of the coil of the magnetic switch 56. Cooperating with the motor 25 is a mechanically driven timer 57, hereinafter described in detail, having a projecting contact 58 adapted, upon operation of the timer, to wipe across a stationary contact 59. This stationary contact 59 has a connection 60 to the opposite terminal of the solenoid 53, while the projecting contact 58 is in electrical connection by means of wire 61 with bridge wire 62, which bridge wire has a stationary contact 63 cooperating with switch arm 64 and a stationary contact 65 cooperating with switch arm 66.

The wire $rl$ has a connection 67 to the opposite side of the lamp $r$ and a connection 68 to the opposite terminal of the coil of the magnetic switch 55. By reason of this construction, when the line $rl$ is energized by the control mechanism, the lamp $r$ will be lighted and the magnetic switch 55 will be energized. This will effect movement of the switch arm 64 into engagement with the contact 63 in which position the parts will remain until another agency, described below, moves the arm 64 out of engagement with the contact 63. In other words, only energization of the magnetic switch 55 is effective for moving the arm 64 to closed position, and another agency must return it to open position.

After the lamp $r$ has remained lighted for the desired interval, the control mechanism will de-energize the line $rl$ and energize the line $al$, which line has a connection 69 to the opposite terminal of the amber lamp $a$, and a connection 70 to the bridge wire 62. At this time the motor circuit will be completed through the line wire L, which at all times constitutes a hot line, connection 71, switch arm 64, contact 63, bridge wire 62, connection 70, and line $al$. The operation of the motor will effect rotation of the timer, which at a predetermined time will cause the contact 58 to wipe across the contact 59. At such time, the circuit through the solenoid 53 will be completed from wire L, connection 52, wire 60, contacts 59 and 58, wire 61, connection 70 and wire $al$, thereby energizing the solenoid 53 and causing movement of its arm 72. This arm 72 cooperates with the switch arms 64 and 66, and will, when actuated by the solenoid 53, cause opening movement of the switch arms 64 and 66, thereby moving the arm 64 away from the contact 63 and breaking the motor circuit. Thereafter, and during the entire interval of time that the amber lamp remains illuminated, the switch arms 64 and 66 will be in their neutral position. The momentum of the motor 25 and the gearing connecting it to the timer 57 will be sufficient to cause the contact 58 thereof to move away from the contact 59 when the motor is disconnected.

After the desired interval of time, the control mechanism will de-energize the line al and energizes the line gl having a connection 73 to the opposite terminal of the lamp g and a connection 74 to the opposite terminal of the coil of the magnetic switch 56. This will energize the switch 56 through the connections illustrated and effect movement of the switch arm 66 into engagement with the contact 65, in which position it will remain until moved back to neutral position by the solenoid 53 through the agency of the arm 72, as explained in the succeeding paragraph.

After the desired interval, the line gl will be de-energized and the line al again energized to effect a traffic change. At this time the motor circuit will again be completed through line wire L, connections 51 and 71, to bridge wire 75, bridging the switch arms 64 and 66, and then by switch arm 66, contact 65, bridge wire 62, and connection 70 to the line al. This will again produce operation of the motor and operation of the timer 57 until such time as the timer circuit is closed to energize magnetic switch 53 and move the switch arm 66 to neutral position.

It will be apparent to those skilled in the art that the operating mechanism driven by the motor must include means for effecting a reversal of the direction of travel of the sprocket chain 20 between each successive operation thereof. This reversal is obtained by the construction illustrated in detail in Figures 9 to 12 (both inclusive). As illustrated herein, the armature shaft of the motor has secured thereto a gear 76 which meshes with the similar gear 77, secured to shaft 78. The shaft has a worm 79 thereon meshing with worm wheel 80 on shaft 81. This shaft has loosely mounted thereon a pair of bevel gears 82 and 83, both meshing at all times with the ring gear 84 on shaft 85, to which the sprocket 24 is secured. Splined to the shaft 81 intermediate the bevel gears 82 and 83 is a collar 86, having projecting therefrom a pair of spaced bearings 87, between which is journaled a pawl 88 for rocking movement in either direction about a pivot 89. For maintaining the pawl in one position or the other is a spring 90 cooperating with a pair of pins 91 and normally urging the pins inwardly in such manner as to engage depressions 92 in the pawl as it is rocked in one direction or the other.

Figure 10:
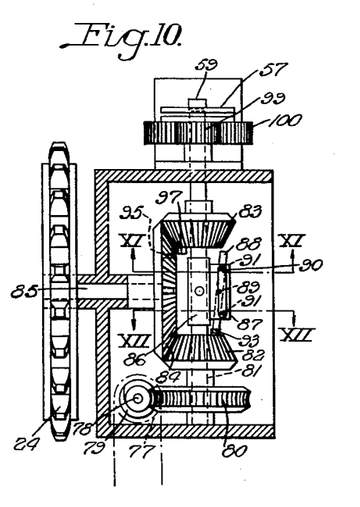
Figure 10 is a side elevational view of the mechanism illustrated in Figure 9.
Figure 11:
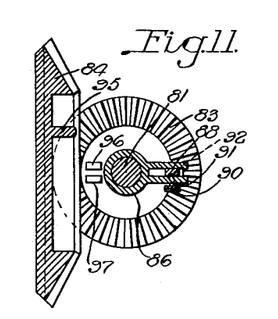
Figure 11 is a detail sectional view along the line XI—XI of Figure 10, looking in the direction of the arrows.
Figure 12:
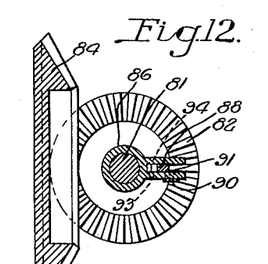
Figure 12 is a detail sectional view along the line XII—XII of Figure 10, looking in the direction of the arrows.

In Figure 10 the pawl is illustrated as having been rocked in a clockwise direction about the pivot 89 to bring its right hand into engagement with the stop 93 on the gear 82. At this time rotation of the shaft 81 through the worm wheel 80 will be effective for rotating the gear 82 through the medium of the pawl 88 and the collar 86. As clearly illustrated in Figure 12, the pawl at this time not only engages a stop 93 but is held in engagement with such stop by a spring pressed pawl 94. Upon operation of the motor, the parts will continue to rotate under the driving influence of the gear 82 until such time as the pin 95 on the ring gear 84 engages the free end of the pawl 88 and rocks it in the opposite direction to disengage it from the stop 93 and the pawl 94 and swing the pawl into engagement with a similar stop 96 and pawl 97 on the gear 83. Thereafter, upon operation of the motor, the ring gear 84 will move in the opposite direction and consequently, through the shaft 85 and sprocket 24, effect movement of the sprocket chain 20 in the reverse direction. During continued operation of the motor, the parts will rotate in this direction until the pin 98 on the ring gear 84 engages the other end of the pawl 88 and causes it to return to the position indicated in full lines in Figure 10. Thereupon, the succeeding operation of the motor will effect a movement of the parts in the direction first indicated, and this reversal will take place between successive operations whereby upon one operation the control means 34 will be lowered, while the control means 34' is raised, and on the next operation the control means 34 will be raised, while the control means 34' is lowered.

For effecting operation of the timer 57, the shaft 81 carries the timing gear 99 meshing with timing gear 100 on the shaft 101, which shaft carries the timer 57 before described. It will be apparent that the gear ratio of the timing gears 99 and 100 is such as to insure operation of the motor for a sufficient interval of time to effect the necessary movement of the control means before the timer circuit is closed to render the motor inoperative, and that in like manner the gear ratio of the gears 82, 83 and 84 are such as to insure the pawl remaining in one position or the other for a sufficient interval of time to accomplish the desired results.

In Figure 13 I have illustrated the cross brace 14 as having secured thereto a rod 102 adapted at its upper end to engage the ornamental means 5 for maintaining it in operative position.

Figures 3, 15, 16:
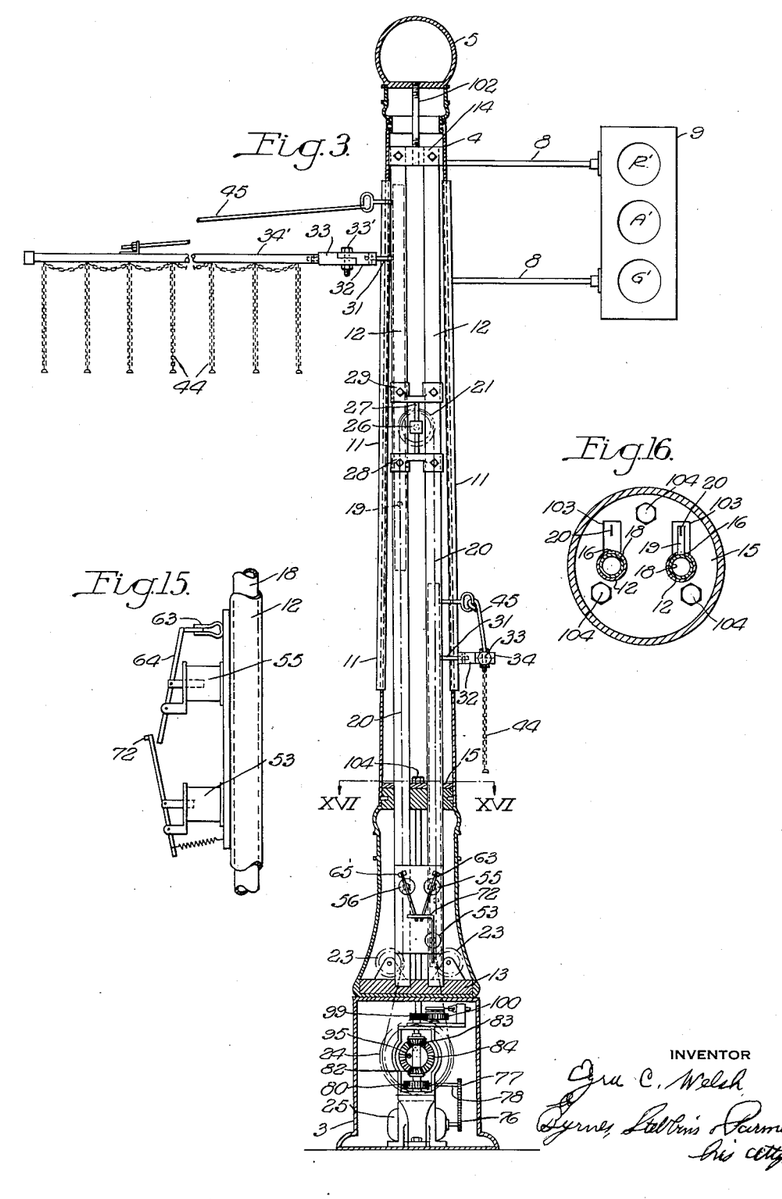
Figure 3 is a view partly in section and partly in elevation of the regulator of Figure 2, the view being generally on the line III—III of Figure 2, looking in the direction of the arrows.
Figure 15 is a side elevational view, on an enlarged scale, of the magnetic switches utilized in accordance with the wiring diagram of Figure 14.
Figure 16 is a detail sectional view on the line XVI—XVI of Figure 3, looking in the direction of the arrows.

In Figure 16 I have illustrated the plate 15 as having slots 103 formed therein of such dimensions as to permit the proper movement therethrough of the pins 19 under the influence of the sprocket chain 20, this chain also traveling through such openings. Extending through the plate 15 are bolts 104 by means of which the column itself may be anchored to the base.

By reason of the construction described, there is provided a traffic regulator capable of simultaneously controlling both vehicular and pedestrian traffic. The adjustability of the control means for the pedestrian traffic enables a unit to be utilized at or adjacent the street intersection at which the angle of intersection of the streets and sidewalks varies from an acute to an obtuse angle, it being merely necessary to adjust the relative positions of the pedestrian control means 34 and 34' to meet the particular conditions encountered.

My invention also provides a traffic regulator adapted to be utilized with systems of the type now in use with control mechanisms of the character utilized for such systems. When operatively connected in circuit with such a control mechanism, there is obtained not only the usual operation of the vehicular control means in the form of lamps as herein indicated, but also the coordinated operation of pedestrian control means.

A regulator in accordance with the present invention further utilizes the time interval during which a traffic change ordinarily occurs for effecting not only the usual operation of the lamps, but also the operation of the pedestrian control means so that both the vehicular control means and the pedestrian control means are in position to effectively control traffic upon a succeeding change from an intermediate condition either to red or green.

Another advantage of the present invention arises from the provision of operating mechanism of the character herein illustrated by means of which the motor need not be continuously operated, it being only necessary to energize the motor periodically at such times as a movement of the pedestrian control means is necessary.

I claim:

1. In a traffic regulator, a hollow standard formed with a vertical slot, a pedestrian control means, supporting means for the control means movable vertically along the slot and mechanism within the standard for positively driving the supporting means in different directions for effecting up or down movement of said supporting means.

2. In a traffic regulator, a hollow standard formed with a pair of vertical slots in different portions thereof, pedestrian control means each having an operating connection projecting through one of the slots, supporting means for the control means movable vertically along the slots within the standard, and mechanism within the standard for simultaneously raising one of the control means and lowering the other of the control means.

3. A traffic regulator, comprising a standard, signals thereon for traffic including barriers for pedestrian traffic, operating means for the barriers, and means for supplying actuating medium to the operating means for raising one of the barriers on the standard and lowering the other barrier.

4. A traffic regulator, comprising a standard, signals thereon for traffic including barriers for pedestrian traffic, said barriers projecting from said standard at substantially right angles one to the other, and means for raising one of the barriers and simultaneously lowering the other of the barriers.

5. A traffic regulator, comprising a standard, signals thereon for traffic including barriers for pedestrian traffic, said barriers projecting from said standard at substantially right angles one to the other, and means for raising one of the barriers and simultaneously lowering the other of the barriers, said means including an endless chain within the standard to which said barriers are connected.

6. A traffic regulator, comprising a hollow standard having a pair of vertically extending guides therein, a pair of carriers guided thereby, means for raising one of said carriers and simultaneously lowering the other of said carriers, a pair of barriers, and operating connections for said barriers extending through slots in said standard and engaging said carriers.

7. A traffic regulator, comprising a hollow standard having a pair of vertically extending guides therein, a pair of carriers guided thereby, means for raising one of said carriers and simultaneously lowering the other of said carriers, a pair of barriers, and operating connections for said barriers extending through slots in said standard and engaging said carriers, the operating means for said carriers comprising an endless chain having one run thereof connected to said carriers and the other run connected to the other of said carriers.

8. In a traffic regulator, a hollow standard, a pair of traffic barriers extending therefrom in angular relation one to the other for controlling the traffic on intersecting ways, and means operatively connected to said barriers for raising one of the barriers and lowering the other and thereafter raising the second mentioned barrier and lowering the first mentioned barrier.

9. In a traffic regulator, a hollow standard, a pair of traffic barriers extending therefrom in angular relation one to the other for controlling the traffic on intersecting ways, and means operatively connected to said barriers for raising one of the barriers and lowering the other and thereafter raising the second mentioned barrier and lowering the first mentioned barrier, said means comprising an endless chain within said standard having its runs connected to the respective barriers.

10. In a traffic regulator, a hollow standard, a pair of traffic barriers extending therefrom in angular relation one to the other for controlling the traffic on intersecting ways, and means operatively connected to said barriers for raising one of the barriers and lowering the other and thereafter raising the second mentioned barrier and lowering the first mentioned barrier, said means including an endless chain having its runs operatively connected to the respective barriers, and reversible driving means for said chain within the base of said standard.

11. In a traffic regulator, a standard having vertically extending slots formed therein, a carrier structure adjacent each of said slots, a traffic barrier operatively connected to each of said carrier structures through said slots, and means for simultaneously effecting opposite movements of said carrier structures.

12. In a traffic regulator, a standard having vertically extending slots formed therein, a carrier structure adjacent each of said slots, a traffic barrier operatively connected to each of said carrier structures through said slots, and means for simultaneously effecting opposite movements of said carrier structures, said means including an endless chain having the runs thereof connected to different carrier structures.

13. In a traffic regulator, a standard having vertically extending slots formed therein, a carrier structure adjacent each of said slots, a traffic barrier operatively connected to each of said carrier structures through said slots, and means for simultaneously effecting opposite movements of said carrier structures, said means including an endless chain having the runs thereof connected to different carrier structures and a motor in the base of said standard for operating said chain.

14. In a traffic regulator, a standard, a barrier projecting from said standard, operating means for said barrier within the standard, and means for angularly adjusting the relationship between the standard and barrier.

15. In a traffic regulator, a standard, barriers projecting from opposite sides thereof, means for operating said barriers, and means for angularly adjusting the direction of extension of one of said barriers.

In testimony whereof I have hereunto set my hand.

EZRA C. WELSH.